3,227,772
CONTROL OF HYDROGEN BUILDUP IN THE ISOMERIZATION OF HYDROCARBONS

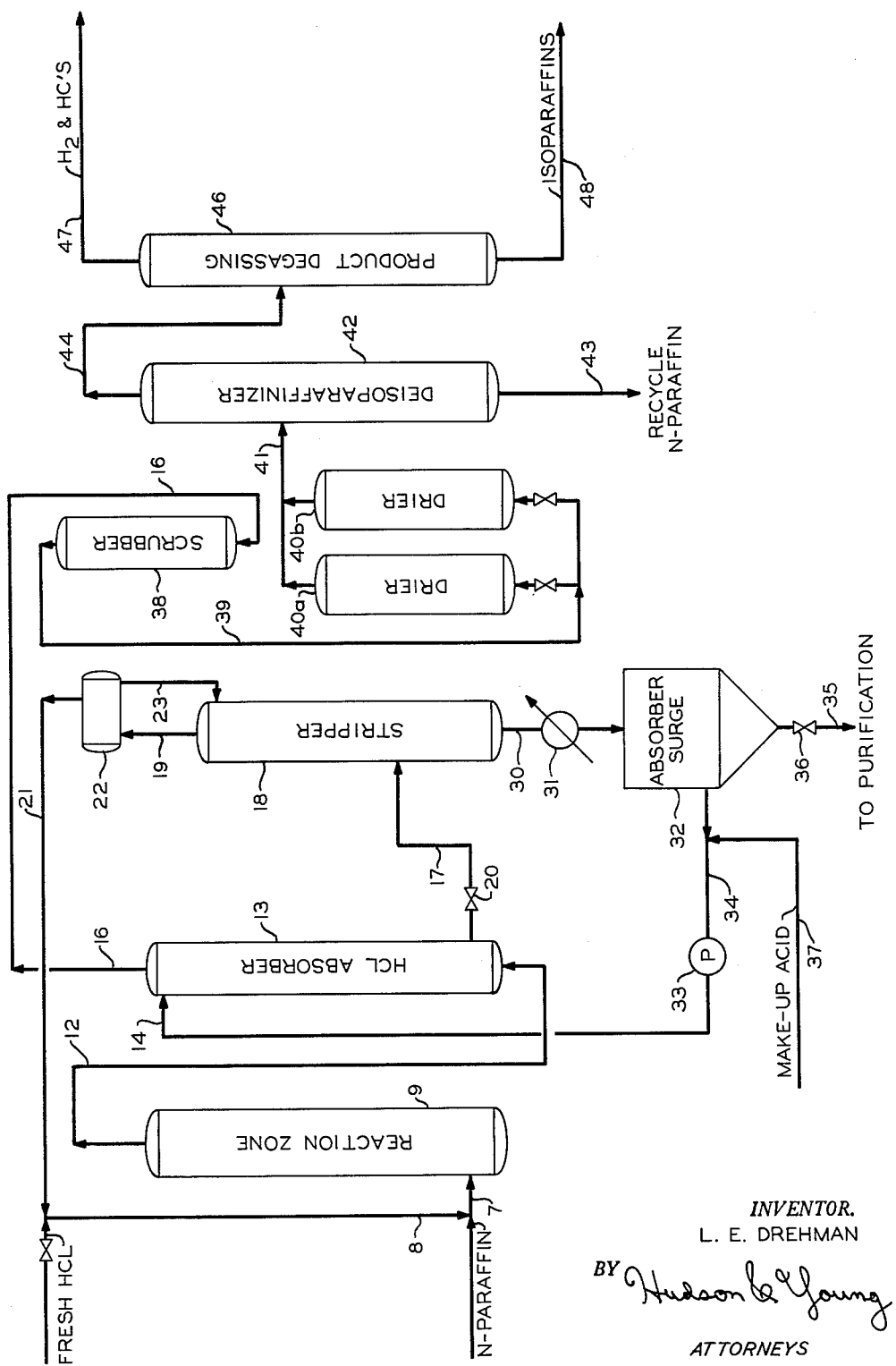

Lewis E. Drehman, Bartlesville, Okla., assignor to Phillips Petroleum Company, a corporation of Delaware
Filed July 20, 1961, Ser. No. 125,418
4 Claims. (Cl. 260—683.7)

This invention relates to the isomerization of normal paraffin hydrocarbons. In one aspect it relates to the vapor phase isomerization of normal paraffins wherein the operating pressures in the reactor can be maintained at desirably low levels. In another aspect it relates to liquid phase isomerization of normal paraffins wherein increased recovery of the hydrogen halide promoter is achieved while undesirable build-up of hydrogen is obviated.

It is well established technology how to subject straight chain paraffin hydrocarbons obtained from sundry sources to isomerization reactions that convert these hydrocarbons to branched chain isomers. The branch chain paraffins are generally better motor fuel blending stocks than the corresponding normal isomers. The branch chain paraffins can also be alkylated to form heavier, more-branched, hydrocarbons, which are even more desirable for motor fuel. The isomerization reactions can be realized by contacting liquid n-paraffins with a supported aluminum chloride catalyst. The presence of hydrogen chloride has been found to promote the catalytic activity.

It is customary to strip the reactor effluent of non-condensables, hydrogen chloride, and light hydrocarbons which are all returned to the reactor. A by-product of both vapor and liquid phase isomerization is hydrogen. The concentration of hydrogen soon builds up because it is being recycled. It has been demonstrated that hydrogen is a potent inhibitor of the isomerization reaction over supported aluminum chloride catalyst, particularly in the liquid phase operation.

Isomerization is also carried on in the vapor phase. Here, inhibition of the conversion rate is much less significant; however, the build-up of $H_2$ and lighter hydrocarbons entails a concomitant increase in the operating pressure of the isomerization reactor, which can soon reach undesirable levels.

It is then apparent that in normal paraffin isomerization, whether it be carried on in the liquid or vapor phase, maintenance of the amount of hydrogen at a minimal practical level is desirable for best process economics.

It is an object to provide an improved process for the isomerization of paraffin hydrocarbons.

It is a further object of this invention to provide a means of controlling the build-up of hydrogen in a process for the isomerization of normal paraffins.

It is another object to provide improved means for removing $H_2$ and lighter hydrocarbons from one of the recycle streams in both the vapor and liquid phase processes for the isomerization of normal paraffins over supported metal halide catalyst with a hydrogen halide promoter.

It is a further object to make provision for the improved recovery of the hydrogen halide promoter from the reactor effluent which is to be recycled to the isomerization zone.

These and other objects of my invention will be apparent to those skilled in the art from the following discussion and appended claims.

According to the present invention, there is provided an absorber disposed immediately downstream of the normal paraffins isomerization zone, which is employed to scrub the reactor effluent of its hydrogen halide promoter content by utilizing an aqueous hydrochloric acid solution. The scrubbed reactor effluent still containing $H_2$ and lighter hydrocarbons, but now virtually none of the promoter, is then caustic-washed, dried, and finally fractioned in a first column. Unisomerized normal paraffins are recovered as a bottoms stream from said first column which are recycled to the reactor for further isomerization, while the isoparaffin product is produced as an overhead stream, along with hydrogen and lighter hydrocarbons. Since these latter materials do not recycle, their concentrations do not build-up to the detriment of the process.

Concomitantly, the aqueous HCl stream from the bottom of the absorber, enriched with the separated promoter, is flashed or fractionated in a stripper vessel to recover the hydrogen halide promoter as an overhead product. The recovered halide is then recycled to the reactor to again serve its promoter function, while the bottoms product from the stripper consisting of an aqueous hydrogen chloride is recycled to the absorber for further scrubbing of reactor effluent.

This invention will be more fully understood with the following description of the process diagram shown in the accompanying drawing. Referring thereto, a hydrocarbon stream comprising mostly unisomerized paraffins enters the system via conduit 7. Also, a combined fresh and recycle stream of essentially anhydrous hydrogen halide promoter enters conduit 7 via conduit 8. Stream 7 enters the bottom portion of reactor 9 flowing therethrough.

The catalysts employed in carrying out isomerization comprise aluminum halides, such as aluminum chloride and aluminum bromide. The catalysts may be present as complexes which are formed by interaction between the metal halides and hydrocarbons present in the reaction system or as the aluminum halides supported on a solid support, such as alumina, bauxite, or the like.

The hydrogen halide promoter concentration within said reaction zone will vary dependent on the particular hydrocarbon being charged. Ordinarily, the promoter will be present in the reaction zone in an amount less than 40 mol percent of the total charge, and will preferably comprise from 5 to 20 mol percent of the charge of the reactor. Ordinarily, HCl and HBr are the preferred promoters and of these the former is more commonly used.

In the usual method of operation, the reaction zone is maintained at a temperature in the range 50 to 350° F. under a pressure substantially atmospheric to about 600 p.s.i.g. The contact or residence time of the reactants in the reaction zone varies but is usually between about 0.1 and about 5 hours.

In liquid phase isomerization, the reactor must be operated at a pressure sufficient to maintain the normal paraffin-promoter mixture in the liquid phase. For example, where four pounds per minute of promoter, and 96 pounds per minute of normal butane are charged to the reactor at a temperature of 210° F., the reactor is operated at 350 p.s.i.g. to maintain liquid phase conditions.

The effluent from reactor 9 passes from the upper portion thereof via conduit 12. This effluent comprises isobutane, normal butane, hydrogen halide promoter, and hydrogen and lighter hydrocarbons which formed as side products in the reactor. The reactor effluent enters the bottom portion of absorber 13, wherein the effluent makes countercurrent, liquid-liquid contact with a downwardly-flowing aqueous stream of hydrogen chloride entering the upper portion of absorber 13 via line 14.

Absorption zone 13 preferably is operated with about volumetric ratios of aqueous hydrogen chloride solution and reactor effluent in the range 10:1 to 1:10. The absorber pressure can be operated from atmospheric to about 600 p.s.i.g., and at temperatures from about 50 to about 150° F. In general, the absorber is operated within this range as near the effluent temperature of the reactor as practical.

A hydrocarbon stream, containing only a trace of promoter, is removed from the upper portion of absorber 13 via conduit 16. Concurrently, promoter-enriched aqueous hydrogen chloride is removed from the bottom portion of the absorber via conduit 17.

Regarding bottoms stream 17, under equilibrium conditions, it passes to the bottom portion of stripper 18. The stripper is operated at about 975 p.s.i.g. with a cooling water temperature of 80° F. Obviously, provision for refrigeration reduces the high pressure requirements of its construction, and thus the cost of stripper 18. The vapor taken overhead in line 19 is essentially anhydrous hydrogen halide, with a moisture content of about 100±50 p.p.m. This material is essentialy free from hydrogen and lighter hydrocarbons. A portion of the hydrogen halide promoter is returned to the reactor 9 by way of lines 21, 8 and 7, after liquefaction in condenser 22. The remainder of the liquid phase in condenser 22 is returned as reflux by way of line 23 to stripper 18.

Lean hydrochloric acid ranging from about 20 to 30 weight percent HCl content, passes from the bottom portion of stripper 18, via conduit 30 having a heat exchanger 31 disposed therein, to a surge tank 32.

Surge tank 32 serves its usual function of providing an ample supply of acid for absorber 13. Acid is drawn via pump 33 in outlet conduit 34 back to conduit 14 connected to the feed plate of absorber 13. A small amount of the recycle acid in surge 32 may be removed therefrom via conduit 35, having valve 36 therein, for removal of impurities, thereby preventing their build-up in the system. A conduit 37 connects with surge outlet conduit 34 for adding fresh absorber acid, as required.

Although the composition may vary from time to time, the absorber acid in surge 32 is in the range of about 20–36 weight percent hydrogen chloride surge, but preferably from 20 to 30 weight percent. Acid in conduit 17 from the absorber is enriched in hydrogen chloride, compared to the feed, due to absorption of HCl in absorber 13.

Regarding stripper 18 it is ordinarily operated to deliver essentially anhydrous hydrogen halide overhead, with the temperature of the available cooling water from 80 to 100° F. dictating the stripper pressure. In general, the pressure in the stripper is maintained in the range 975 to about 1000 p.s.i.g. When it is desired to operate the stripper at lower pressure, the feed temperature is reduced, and refrigeration is provided on the overhead condenser.

Regarding overhead stream 16 from absorber 13 the hydrocarbons therein all pass to the bottom of a scrubber 38, wherein they are countercurrently contacted with an aqueous alkali hydroxide, such as caustic soda, for the removal of any traces of entrained absorber acid. The scrubbed effluent from the top of tower 38 passes via conduit 39 to the bottoms of driers 40a and b, which may be sand filters, or be filled with any of the solid, adsorbent-type drying agents. For example, the two parallel vessels are filled with anhydrous alumina, and are alternately in the adsorption and regeneration phases, so that continuous flow of the hydrocarbon product stream therethrough is possible.

The acid-free hydrocarbons pass from driers 40a or b, via conduit 41, to the middle portion of deisoparaffinizer tower 42, which is operated here as a deisobutanizer. Normal butane is removed from the bottom of tower 42 via conduit 43, and recycled to reactor feed conduit 7, via a feed fractionator (not shown).

The overhead stream from column 42 comprises isobutane, normal butane, and those light hydrocarbon components of overhead stream 16 from absorber 13, which boil below isobutane. This stream passes via conduit 44 to a product degassing column 46. Non-condensible gases, hydrogen, and the normally gaseous lighter hydrocarbons pass therefrom in the overhead conduit 47 to disposal. The bottoms stream from column 46 constitutes substantially acid- and hydrogen-free, anhydrous isobutane, which is removed via conduit 48 to further processing.

The material balance set forth in Table I is representative of the operation of this invention. The process is operated at equilibrium conditions. Hydrogen chloride is the promoter. Operation at the upper end of the HCl concentration of the aqueous acid is given. Clearly, operation with lower concentration of hydrochloric acid in the absorber acid feed will require smaller amounts of absorber acid.

TABLE I

*Material balance, lb./hr.*

| Stream Conduit | 7 | 12 | 14 | 16 | 17 | 30 | 21 | 43 | 47 | 48 |
|---|---|---|---|---|---|---|---|---|---|---|
| Constituent: | | | | | | | | | | |
| Hydrogen | | 6 | | 6 | | | | | 6 | |
| Hydrogen Chloride | 240 | 240 | 4,988 | | 5,228 | 4,988 | 240 | | | |
| Methane | | 6 | | 6 | | | | | 6 | |
| Ethane | | trace | | trace | | | | | | 10 |
| Propane | 115 | 143 | | 143 | | | | | 133 | 3,226 |
| Isobutane | 115 | 3,255 | | 3,255 | | | | 25 | 4 | 17 |
| N-butane | 5,530 | 2,285 | | 2,285 | | | | 2,268 | | |
| Isopentane | | 50 | | 50 | | | | 50 | | |
| N-Pentane | | 15 | | 15 | | | | 15 | | |
| H₂O | | | 9,012 | | 9,012 | 9,012 | | | | |
| Total | 6,000 | 6,000 | 14,000 | 5,760 | 14,240 | 14,000 | 240 | 2,358 | 149 | 3,253 |

The data set forth in Table I demonstrate how hydrogen is removed from the system.

The process of this invention is applicable in general to the conversion of hydrocarbons by isomerization. A wide variety of hydrocarbons can be converted in the isomerization reaction, for example, straight chain paraffins, such as butane, pentane, hexane, heptane, and higher molecular weight compounds can be converted to various isomers. Also, moderately branched paraffins can be converted to more highly branched materials, thus, 2-methylpentane can be isomerized to 2,2-dimethylbutane. It is also possible to isomerize naphthenic hydrocarbons having 5, 6, 7 and more carbon atoms in the rings. Examples include the isomerization of methylcyclopentane to cyclohexane, 1,1-dimethylcyclobutane to methylcyclopentane, 2-dimethylcyclopentane to methylcyclohexane, and the like.

Various other modifications and alterations of this invention will become apparent to those skilled in the art without departing from the scope and spirit of this invention and it should be understood that the latter is not necessarily limited to the aforementioned discussion and accompanying drawing.

I claim:

1. In a liquid phase process wherein normal paraffin hydrocarbons are isomerized to the corresponding isoparaffins in a reaction zone in the presence of a metal halide catalyst and a hydrogen halide promoter at temperatures in the range of about 50° to 350° F., and at pressures in the range of substantially atmospheric to about 500 p.s.i.g., and wherein hydrogen halides and unreacted normal paraffins are recovered and recycled, the improvement which comprises: removing said hydrogen halide directly from the effluent of said reaction zone by contacting said effluent with an aqueous solution of hydrogen chloride in an absorption zone; passing at least a portion of the resulting hydrogen halide-enriched, aqueous hydrogen chloride to a stripping zone to remove said hydrogen halide; recycling the recovered hydrogen halide to said reaction zone; passing the substantially hydrogen halide-free reaction effluent from said absorption zone to a deisoparaffinization zone for separation therefrom of unisomerized paraffins; and passing the resulting product stream to a degassing zone for separation into an isoparaffin product stream and a hydrogen and light hydrocarbon stream, whereby build-up of hydrogen in said process is substantially obviated.

2. In a vapor phase process wherein normal paraffin hydrocarbons are isomerized to the corresponding isoparaffins in a reaction zone in the presence of an aluminum halide catalyst and a hydrogen halide promoter at temperatures in the range of about 50° to 500° F., and at pressures in the range of substantially atmospheric to about 600 p.s.i.g., and wherein hydrogen halides and unreacted normal paraffins are recovered and recycled, the improvement which comprises: removing said hydrogen halide directly from the effluent of said reaction zone by contacting said effluent with an aqueous solution of hydrogen chloride in an absorption zone; passing at least a portion of the resulting hydrogen halide-enriched aqueous hydrogen chloride to a stripping zone to remove said hydrogen halide; recycling the recovered hydrogen halide to said reaction zone; passing the substantially hydrogen halide-free reactor effluent from said absorption zone to a deisoparaffinization zone for separation therefrom of unisomerized paraffins; and passing the resulting product stream to a degassing zone for separation into an isoparaffin product stream and a hydrogen light hydrocarbon stream, whereby the operating pressure on said reaction zone can be maintained at preferably low levels.

3. The process according to claim 1 wherein said metal halide catalyst comprises aluminum chloride and further wherein said hydrogen halide promoter is selected from the group consisting of hydrogen chloride and hydrogen bromide.

4. The process according to claim 1 wherein said normal paraffin hydrocarbons are selected from the group consisting of normal butane, normal pentane, normal hexane, and normal heptane.

References Cited by the Examiner

UNITED STATES PATENTS

| | | | |
|---|---|---|---|
| 2,392,047 | 1/1946 | Kassel | 260—683.7 |
| 2,411,054 | 11/1946 | Pevere | 260—683.7 |
| 2,530,874 | 11/1950 | Gwynn et al. | 260—683.7 |
| 2,786,086 | 3/1957 | Gitterman | 260—583.7 |
| 2,974,181 | 3/1961 | Findlay | 260—683.7 |
| 2,983,774 | 5/1961 | Thompson | 260—683.74 |

FOREIGN PATENTS 505,221   8/1954   Canada.

DELBERT E. GANTZ, *Primary Examiner.*

ALPHONSO D. SULLIVAN, *Examiner.*